United States Patent [19]

Hlinsky

[11] 4,362,449
[45] Dec. 7, 1982

[54] FASTENER ASSEMBLIES

[75] Inventor: Emil J. Hlinsky, Oak Brook, Ill.

[73] Assignee: MacLean-Fogg Company, Mundelein, Ill.

[21] Appl. No.: 98,918

[22] Filed: Nov. 30, 1979

[51] Int. Cl.³ .................. F16B 37/00; F16B 39/04
[52] U.S. Cl. .................. 411/156; 411/368; 411/531; 411/534; 411/537
[58] Field of Search .......... 85/50 C; 151/35, 38; 308/DIG. 7; 411/155, 156, 368, 372, 531, 534, 537, 533

[56] References Cited

U.S. PATENT DOCUMENTS

| | | | |
|---|---|---|---|
| 1,352,918 | 9/1920 | Rohbock | 411/392 |
| 1,412,502 | 4/1922 | Andrioli | 411/379 |
| 1,961,470 | 6/1934 | Winchester et al. | 411/134 |
| 2,552,004 | 5/1951 | Erdman | 411/548 X |
| 2,588,372 | 3/1952 | Erb | 411/432 X |
| 2,844,409 | 7/1958 | Eksergian | . |
| 3,062,252 | 11/1962 | Jackman | 411/155 |
| 3,085,312 | 4/1963 | Evans | 308/DIG. 7 X |
| 3,087,371 | 4/1963 | Orner | 411/11 |
| 3,135,154 | 6/1964 | Zenzic | 411/12 |
| 3,144,803 | 8/1964 | Briles | 411/427 |
| 3,212,387 | 10/1965 | Madansky | 151/38 X |
| 3,386,771 | 6/1968 | Verdier | 301/9 |
| 3,476,010 | 11/1969 | Markay | 411/9 |
| 3,742,808 | 7/1973 | Trembley | 151/38 X |
| 3,784,264 | 1/1974 | Jacilson | 308/8.2 |

FOREIGN PATENT DOCUMENTS

| | | | |
|---|---|---|---|
| 50-21130 | 6/1975 | Japan | 151/38 |
| 1389976 | 4/1975 | United Kingdom | . |

OTHER PUBLICATIONS

"Machine Design", Jan. 19, 1961, vol. 33. No. 2, Paon 182 Self-Aligning Lock Nut.

*Primary Examiner*—Thomas J. Holko
*Attorney, Agent, or Firm*—Mason, Kolehmainen, Rathburn & Wyss

[57] ABSTRACT

Fastener assemblies for mounting a workpiece such as a hub centered wheel rim include a threaded fastener and a clamp washer. The fastener includes a body having a thread structure and a structure engageable by a tool for tightening of a threaded joint to urge the fastener assembly against the workpiece. The clamp washer includes a central aperture surrounding the thread structure and interposed between the fastener body and the workpiece. A pair of cooperating bearing surfaces are formed on the inner end of the workpiece and the outer side of the clamp washer, and a clamp surface is defined on the inner side of the clamp washer. When the fastener assembly is tightened against the workpiece, the bearing surfaces comprise continuous annular spherical zones having common centers and radii of curvature to the end that the bearing surfaces are in intimate wide area face-to-face contact and the clamp surface is in flat area contact with the workpiece regardless of the squareness condition of the threaded joint. The clamp washer may be resiliently deformable during tightening and the clamp surface may initially be of a truncated cone shape in initial circular line contact at its outer periphery with the workpiece. The clamp washer bearing surface may initially be in circular line contact only with the fastener body bearing surface to prevent rotation of the clamp washer against the workpiece. A body of low friction plastic material may be interposed between the bearing surfaces to prevent large frictional forces at the bearing surfaces, and the clamp surface may be scored or roughened to prevent low friction forces at the workpiece.

10 Claims, 8 Drawing Figures

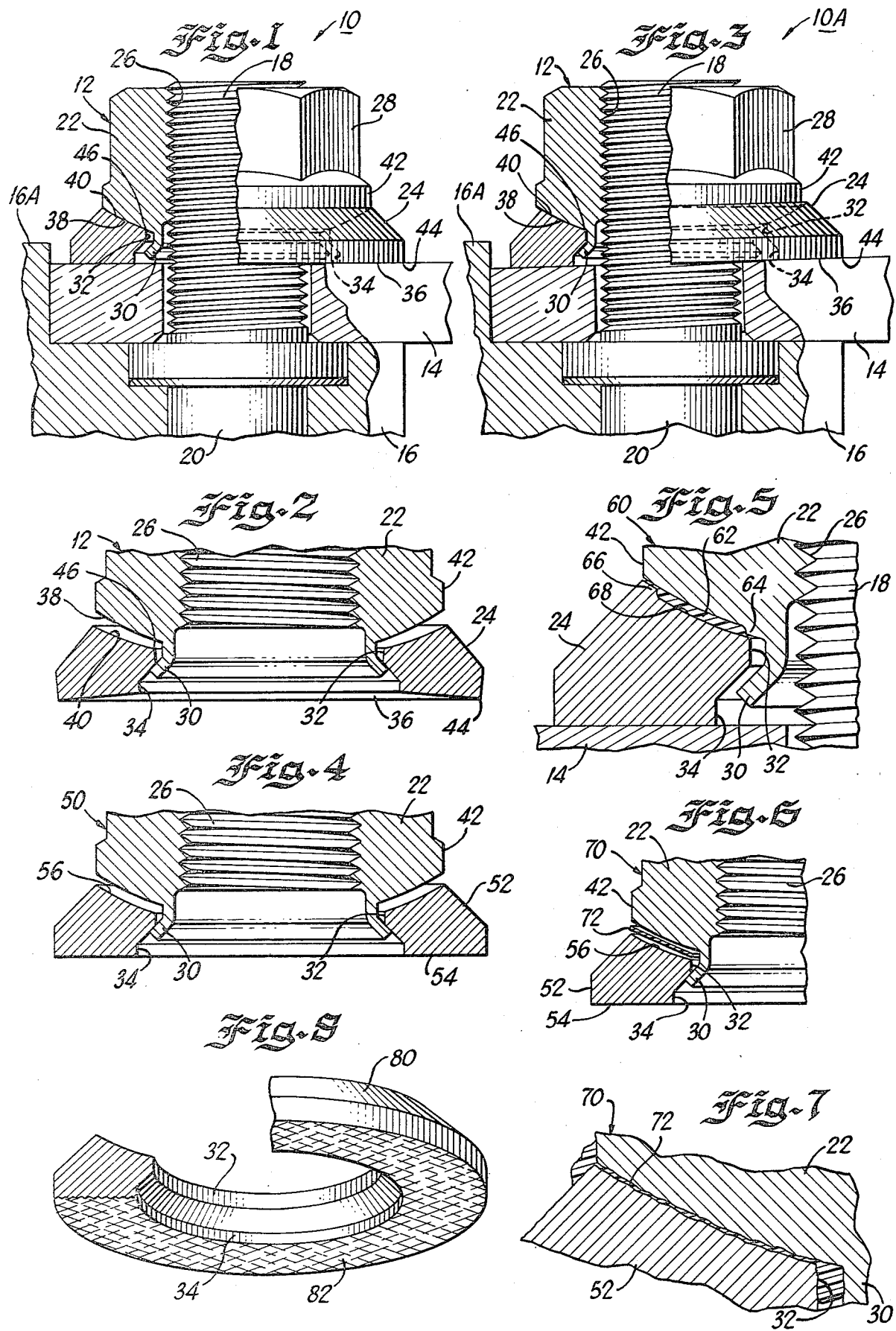

FASTENER ASSEMBLIES

The present invention relates to fastener assemblies and more particularly to improvements in fastener assemblies for applying clamp loads to workpieces such as hub centered wheel rims.

Fastener assemblies known as two-piece wheel nut assemblies have been proposed for attaching wheel rims to the brake drum or other component of a vehicle wheel assembly. A known wheel nut assembly for hub-centered wheel rims includes a nut with an annular pressure plate rotatably captured on the nut. When the nut is tightened on a wheel bolt or stud against the wheel rim, the pressure plate engages the wheel rim and conical bearing surfaces formed on the nut and on the pressure plate engage one another. To prevent damage to the wheel rim, it is intended that the pressure plate remain stationary against the wheel rim while the bearing surfaces permit tightening rotation of the nut relative to the pressure plate.

Difficulties can arise with known wheel nut assemblies of this type. The threaded joint including the wheel rim and the bolt or stud can be out of square for various reasons including tolerance variations and bending or deformation of components including the rim and/or the bolts or stud. When the bolt or stud is not perpendicular to the wheel rim surface, the conical bearing surfaces of the wheel nut and pressure plate are unable to align themselves in full area contact with one another when the pressure plate is flat against the wheel rim. As a result, friction forces which are intended to be distributed over the entire bearing surfaces are instead restricted to a limited area. This can lead to galling or other damage to the bearing surfaces, to increased tightening torque and inconsistent or insufficient clamp loads, and to undesirable rotation of the pressure plate relative to the wheel rim.

Even when the stud or bolt is perpendicular to the wheel rim and the conical bearing surfaces are properly aligned, it cannot be assured that the pressure plate remains stationary on the wheel rim while the nut is rotated. For example, surface imperfections in the bearing surfaces or the presence of dirt or other foreign material can increase the friction between the nut and pressure plate. At the same time, the surface condition of the wheel rim, or the presence of grease or other lubricant beneath the pressure plate, can tend to encourage rotation of the pressure plate. In a substantial proportion of installations, the friction forces at the bearing surfaces can be high enough in relation to the friction forces between the pressure plate and wheel rim to cause rotation of the pressure plate. This can cause undesirable damage to the wheel rim surface. Moreover, the desired relationship between predetermined tightening torque and a desired clamp load is lost.

Among the important objects of the present invention are to provide improvements in fastener assemblies typified by two-piece wheel nuts; to provide a fastener assembly capable of performing in the intended manner when used in both square and in out of square threaded joints; to provide fastener assemblies in which it is assured that a clamp washer or pressure plate remains stationary during tightening rotation of the nut or fastener; to provide fastener assemblies characterized by a consistent relationship between tightening torque and clamp load despite variables such as nonperpendicular joint components, the presence of foreign materials, undesirable lubricants, and the like; and to provide fastener assemblies overcoming disadvantages of those proposed or used in the past.

In brief, the objects and advantages of the present invention are achieved in one embodiment of the invention by the provision of a fastener assembly for applying a clamp load to the surface of a workpiece in a threaded joint. The fastener assembly includes a threaded fastener having a body and having a thread structure disposed generally in a cylindrical plane parallel to and surrounding the central longitudinal axis of the body. The body includes a structure engageable by a tool for tightening of the threaded joint to urge the fastener assembly against the workpiece. The assembly further includes a clamp washer having a central aperture surrounding the cylindrical thread structure plane and interposed between the fastener body and the workpiece.

A body bearing surface is defined on the workpiece-facing end of the fastener body. A cooperating and interfacing washer bearing surface is defined on one side of the clamp washer. A workpiece engaging clamp surface is defined on the other side of the clamp washer.

In accordance with a feature of the invention, the body bearing surface is a continuous annular spherical zone having a center of curvature on the body axis. Moreover, in the tightened condition of the fastener assembly, the washer bearing surface is a similar spherical zone in engagement with the body bearing surface and the washer clamp surface in the tightened condition is in intimate area engagement with the workpiece surface.

In one embodiment of the invention, the clamp washer is resiliently deformable upon tightening of the threaded joint. When used with a flat, planar workpiece surface, the clamp surface is initially in the form of a truncated cone having a center of revolution coinciding with the fastener body axis. Prior to tightening, the clamp surface is engageable with the workpiece surface in a circle line of contact at the radially outer periphery of the clamp surface. Moreover, prior to tightening, the washer bearing surface is initially engageable with the body bearing surface in a circle line of contact at the radially inner periphery of the washer bearing surface. As the threaded joint is tightened, the clamp washer is deformed so that full area contact is achieved between the bearing surfaces and between the clamp surface and workpiece surface.

In accordance with another aspect of the present invention, a body of low friction plastic material is interposed between the bearing surfaces of the fastener body and the clamp washer. The plastic material may be coated on one or both bearing surfaces or may be in the form of a discrete annular washer. The surfaces are formed to provide recess means for preventing extrusion of the plastic material from between the bearing surfaces. This may be accomplished by forming dam projections at the region of the bearing surfaces, or by forming the bearing surfaces in a rough condition.

In accordance with another aspect of the present invention, the clamp surface of the clamp washer may be roughened or scored to assure substantial frictional forces between the clamp washer and the workpiece. In this manner inadvertent rotation of the clamp washer may be prevented.

The present invention together with the above and other objects and advantages may be best understood from consideration of the following detailed description of the embodiments of the invention illustrated in the accompanying drawing, wherein:

FIG. 1 is a side view, partly in section, of a threaded joint including a fastener assembly constructed in accordance with the present invention;

FIG. 2 is a fragmentary sectional view on an enlarged scale of a portion of the fastener assembly of FIG. 1 prior to its installation in a threaded joint;

FIG. 3 is a view similar to FIG. 1 illustrating a threaded joint in which components of the joint are out of square;

FIG. 4 is a view similar to FIG. 2 illustrating an alternative form of the invention;

FIG. 5 is a fragmentary sectional view on an enlarged scale illustrating portions of a threaded joint including a fastener assembly comprising an alternative embodiment of the invention;

FIG. 6 is a fragmentary sectional view of a fastener assembly comprising another alternative embodiment of the invention;

FIG. 7 is a fragmentary sectional view on an enlarged scale illustrating the fastener assembly of FIG. 6 in the tightened condition; and FIG. 8 is a perspective view, partly broken away, illustrating the clamp washer portion of a fastener assembly comprising another alternative embodiment of the present invention.

Having reference now to the drawings, and initially to FIG. 1, there is illustrated a threaded joint designated as a whole by the reference numeral 10 and including a fastener assembly generally designated as 12 and constructed in accordance with the principles of the present invention. While the fastener assembly 12 may be used for applying clamp loads to workpieces of various types, in the illustrated arrangement the threaded joint 10 is part of a wheel mounting assembly for a vehicle or the like and includes a wheel rim 14 mounted upon a brake drum or other vehicle component 16 and centered by engagement with a hub portion 16A. In order to secure the wheel rim 14 in position, the fastener assembly 12 is threaded onto a male threaded shank portion 18 of a wheel bolt or stud 20 attached to the drum or component 16.

In general, the fastener assembly 12 of the present invention includes a fastener body 22 in assembly with and cooperating with a clamp washer 24. When the fastener assembly 12 is installed in the threaded joint 10, the clamp washer 24 is sandwiched between the fastener body 22 and the workpiece 14. Fastener body 22 in the illustrated arrangement comprises a hex nut since the threaded joint 10 includes the male threaded bolt or stud 20. Principles of the present invention are applicable as well to fasteners other than nuts, such as head bolts and screws. Consequently, the term fastener body should be understood to encompass not only the body 22 of a nut but the head portion of a shanked fastener.

For engagement with the male threaded shank portion 18, the fastener body 22 includes a female thread structure 26 lying generally in a cylindrical plane symmetrical about the central longitudinal axis of the body 22. To permit tightening of the threaded joint 10, the body 22 includes a wrenching structure 28 provided by the flats of the hex-shaped nut body. With fastener bodies of other forms, male rather than female thread structures might be provided and various types of wrenching structures or driver blade or bit engaging structures may be utilized for tightening of the fastener assembly in a threaded joint.

The body 22 and washer 24 are maintained in assembled relation by means of a flange or collar 30 extending axially from the fastener body 22 through a reduced diameter neck portion 32 of the central axial opening 34 of the clamp washer 24. The outermost segment of the flange or collar 30 is swaged or formed radially outwardly to prevent disassembly of the clamp washer 24 from the fastener body 22 while permitting free rotation as well as limited movement in other directions therebetween.

Upon tightening of the threaded joint 10, the clamp load developed by tightening of the fastener body 22 is applied to the workpiece 14 by means of the clamp washer 24. In the illustrated arrangement, the workpiece 24 includes a flat, planar surface and the clamp washer 24 includes a clamp surface 36 which, upon tightening, is of corresponding flat, planar shape.

In accordance with a feature of the invention, the fastener assembly 12 includes a bearing region at the interface of a pair of bearing surfaces 38 and 40 formed respectively on the inner end of the fastener body 22 and on the outer side of the clamp washer 24. The bearing surfaces 38 and 40 permit rotation of the fastener body 22 during tightening of the joint 10 while the clamp washer 24 remains stationary, regardless of the squareness condition of the components of the threaded joint 10.

More specifically, the fastener body 22 includes a flange structure 42 and the body bearing surface 38 is formed on the underside of this flange structure. The bearing surface 38 is in the shape of a continuous, annular zone of a sphere having a uniform radius of curvature and having a center lying along the central longitudinal axis of the fastener body 22. In the illustrated arrangement, the center of curvature is disposed at the opposite side of the bearing region from the workpiece engaging clamp surface 36. In the tightened condition, the washer bearing surface 40 is identical in shape with the body bearing surface 38, and thus also is a continuous, annular zone of a sphere having the same radius of curvature and center point. When tightened, the bearing surfaces 38 and 40 are in intimate, wide area contact and are generally of the same radial width. This wide area bearing contact permits rotation of the fastener body 22 while the clamp washer 24 is stationary on the surface of workpiece 14.

In FIG. 3 there is illustrated a threaded joint designated as a whole by the reference character 10A. The joint 10A is similar to the joint 10 of FIG. 1 in all respects except as regards the squareness of the joint. The joint 10A is substantially out of square in that the male threaded shank portion 18 of the bolt or stud 20 is not perpendicular to the outer surface of the workpiece 14. Even in this adverse installation, intimate and wide area contact is achieved in the tightened condition between the clamp surface 36 of the clamp washer 24 and the workpiece surface, and also between the bearing surfaces 38 and 40. Since, in the tightened condition, the bearing surfaces 38 and 40 are identically shaped spherical zones, the fastener body 22 can rotate or swivel relative to the clamp washer 24 and such movement does not prevent intimate, wide area bearing contact between the surfaces 38 and 40. As a result, even in the out of square joint 10A illustrated in FIG. 3, the fastener body 22 is able to rotate in the tightening direction with low friction forces imposed upon the stationary clamp washer 24.

In accordance with a feature of the present invention, the clamp washer 24 is initially formed in a configuration different from that assumed after tightening of the threaded joint, and the initial shape of the clamp washer 24 is such as to assure that the clamp washer 24 does not rotate relative to the workpiece during tightening of the fastener assembly 12. The fastener assembly 12 in the untightened condition is illustrated in FIG. 2. The clamp surface 36 of the clamp washer 24 is initially in the shape of a truncated cone rather than in the flat shape assumed after tightening and illustrated in FIGS. 1 and 3. Moreover, the washer bearing surface 38 has an initial shape which is not identical to the spherical zone shape of the body bearing surface 38. Considered in comparison with its final shape, the washer 24 is somewhat bowed or cupped in its initial configuration.

When the fastener assembly 12 illustrated in FIG. 2 is initially assembled in a threaded joint, prior to tightening, the outermost periphery 44 of clamp surface 36 initially contacts the surface of the workpiece 14. This contact takes place along a circular line and is thus a circle line contact rather than an area contact. Similarly, the washer bearing surface 40 initially contacts the body bearing surface 38 at the inner periphery 46 of the washer bearing surface 40. This contact is also a circular line contact rather than an area contact.

The radius of the line circle contact at periphery 44 between the clamp surface 36 and the workpiece 14 is substantially larger than the raidus of the line circle contact 46 between the bearing surfaces 38 and 40. This differential in radius results from the direction in which the clamp washer 24 is bowed or cupped, and furthermore is increased by enlarging the diameter of the clamp washer 24 relative to the diameter of the nut body 22 and flange structure 42.

As a result of the differential in radius of the circular contact lines, the flange washer 24 is caused to remain stationary upon the workpiece 14 rather than to rotate with the nut body 22 as the fastener assembly 12 is tightened. Frictional forces developed between the moving fastener body 22 and the clamp washer 24 due to contact at circle 46 apply a torque to the clamp washer 24 tending to cause it to rotate. Conversely, frictional forces between the clamp surface 36 and the surface of the workpiece 14 along the line circle 44 apply a torque tending to cause the clamp washer 24 to remain stationary. As a result of the fact that the circle 44 is substantially larger than the circle 46, the effective lever arm through which frictional forces act to create torque is substantially larger with respect to the forces tending to hold the clamp washer 24 stationary.

As the fastener assembly 12 is tightened from the initial position to the fully tightened position illustrated in FIG. 1 or FIG. 3, the clamp washer 24 gradually deforms in a resilient manner. During tightening, the clamp surface 36 changes from its initial conical shape to a flat planar shape in wide area contact with the workpiece 14. Simultaneously, the washer bearing surface 40 deforms from its initial shape to the spherical zone shape assumed in the tightened condition. Since the deformation of the clamp washer 24 takes place within the elastic limit of the material of the washer, the clamp washer also provides the beneficial action of a spring washer and prevents inadvertent loosening of the fastener assembly 12 due to cyclical loading, vibrations or the like.

Having reference now to FIG. 4, there is illustrated in fragmentary form a fastener assembly 50 comprising another embodiment of the invention. The fastener assembly 50 includes the fastener body 22 associated with a clamp washer 52 and differs from the fastener assembly 12 in that the clamp washer 52 is not deformed or changed in shape as it is tightened.

More specifically, the clamp washer 52 includes a clamp surface 54 which is of the same initial shape as the surface of the workpiece 14, and thus in the illustrated arrangement is flat and planar. Moreover, the washer 52 includes a bearing surface 56 which is both initially and after tightening a continuous annular zone of a sphere having the same radius of curvature as the fastener body bearing surface 38. When the fastener assembly 50 is tightened to apply a clamp load in a threaded joint such as the joint 10 or the joint 10A of FIGS. 1 and 3, the similar spherical bearing surfaces 38 and 56 permit intimate and wide area bearing surface contact at the bearing region regardless of the squareness condition of the joint.

In accordance with one feature of the present invention, the possibility of excessive friction at the bearing surface region may be avoided by the provision of a lubricating agent between the bearing surfaces. In FIG. 5 there is illustrated a fastener assembly generally designated as 60 including a fastener body 22 and a clamp washer 24 and further including an annular body 62 of low friction plastic material. The clamp washer 24 may be either of the type illustrated in FIG. 2 or the type illustrated in FIG. 4 insofar as its initial configuration is concerned.

In FIG. 5, the fastener assembly 60 is illustrated in the tightened condition. The body of material 62, which may for example be a fluorocarbon or TFE plastic material, present between the bearing surfaces 38 and 40 assures that the frictional forces tending to urge rotation of the clamp washer 24 are minimized to the end that the clamp washer remains stationary against the surface of the workpiece 14. The material 62 may be applied as a coating to one or both of the bearing surfaces 38 and 40. Alternatively, the body of material 62 may initially be in the form of a discrete separate annular washer interposed in the fastener assembly 60 between the fastener body 22 and the clamp washer 24.

In order to prevent extrusion of the body of material 62 from between the bearing surfaces 38 and 40, and thus to avoid loss of the lubrication properties of the body of material 62, a pair of continuous annularly extending dams 64 and 66 are provided in the bearing region. Between the dams 64 and 66 there is defined a space or recess 68 wherein the body of material 62 is captured despite the presence of substantial bearing forces between the surfaces 36 and 38. In the illustrated arrangement, the radially inner dam 64 is formed as a projection in the body bearing surface 38, while the radially outer dam is formed as a projection on the washer bearing surface 40.

In FIGS. 6 and 7, there is illustrated a fastener assembly 70 comprising yet another embodiment of the present invention. The fastener assembly 70 in addition to the nut body 22 and the clamp washer 52 includes a continuous annular and discrete washer-like body of low friction plastic material 72. As can be seen in FIG. 6, prior to installation of the fastener assembly 70 in a threaded joint, the washer 72 of low friction plastic material is held in assembly between the bearing surfaces 38 and 40 by means of the swaged or formed flange or collar 30 extending through the reduced neck portion 32 of the clamp washer 24. The clamp washer 52 may be either of the type illustrated in FIG. 2 or the type illustrated in FIG. 4.

When the fastener assembly 70 is installed in a threaded joint to the tightened condition illustrated in FIG. 7, the washer 72 of the low friction plastic material is sandwiched between the bearing surfaces 38 and 40 to provide lubrication and to prevent the application of substantial frictional forces from the rotating fastener body 22 to the stationary clamp washer 24. In accordance with the invention, complete extrusion of the material of the washer 72 from between the bearing surfaces 38 and 40 is prevented by forming the bearing surfaces 38 and 40 with a rough surface.

While the rough surfaces of the bearing surfaces 38 and 40 may be provided in a variety of ways, in the configuration illustrated in FIG. 7 the roughness results from hot forming of the fastener body 22 and the clamp washer 24 without further surface plating or machining operations such as would normally be performed. The hot forming process provides sufficient surface roughness or porosity to form a myriad of surface recesses sufficient to capture and retain material of the washer 72 in the bearing region. This is indicated in exaggerated fashion in FIG. 7 for purposes of illustration. This method of providing roughened bearing surfaces not only has the advantage of retaining the lubricating material of the washer 72 in the bearing region, but also greatly reduces the cost of manufacturing the fastener assembly 60.

Having reference now to FIG. 8, there is illustrated a clamp washer 80 which may be combined with a fastener body 22 to form a fastener assembly comprising yet another alternative embodiment of the present invention. The clamp washer 80 differs from the clamp washers of the fastener assemblies 12, 50, 60 and 70 in that the clamp surface 82 is roughened in order to assure substantial friction between the clamp surface 82 and the surface of a workpiece 14 upon installation of the fastener assembly in a threaded joint such as that illustrated in FIG. 1 or FIG. 3. The roughening of the surface 82 may be provided by grooving or scoring the surface. With this structure, the frictional forces developed between the clamp washer 80 and a workpiece 14 are substantial and reliably serve to prevent the undesirable rotation of the clamp washer 80 when an associated fastener body 22 is rotated to the tightened condition.

While the invention has been described with reference to details of the illustrated embodiments, such details are not intended to limit the scope of the invention except as set forth in the following claims.

What is claimed and desired to be secured by Letters Patent of the United States is:

1. A fastener assembly for applying a clamp load to the flat, planar surface of a workpiece in a threaded joint, said fastener assembly comprising:
a threaded fastener having a body and having a thread structure disposed generally in a cylindrical plane parallel to and surrounding the central longitudinal axis of said body;
said body including a structure engageable by a tool for tightening of the threaded joint to urge the fastener assembly against the workpiece;
a clamp washer rotatable relative to said body and having a central aperture surrounding said cylindrical plane and interposed between said fastener body and the workpiece;
a body bearing surface defined on the workpiece-facing end of the fastener body and a cooperating washer bearing surface defined on one side of said clamp washer and interfacing with said body bearing surface; and
a workpiece engaging clamp surface defined on the opposite side of said clamp washer;
said clamp surface, prior to tightening, being uniplanar and generally conical and engageable with said workpiece only along a circular line of contact at the radially outer periphery of said clamp surface, and said washer bearing surface, prior to tightening, being engageable with said body bearing surface at the radially inner periphery of said washer bearing surface and spaced from said body bearing surface at the radially outer periphery of said washer bearing surface;
said body bearing surface comprising a continuous annular spherical zone having a center of curvature lying on said body axis;
said body bearing surface and said washer bearing surface having equal radii of curvature;
said washer bearing surface in the tightened condition comprising a similar spherical zone in engagement with the body bearing surface and said clamp surface in the tightened condition comprising a flat, planar surface in engagement with said workpiece.

2. A fastener assembly as defined in claim 1, said clamp surface being rough to prevent rotation of said clamp washer on the workpiece.

3. A fastener assembly as claimed in claim 1 further comprising a body of low friction plastic material interposed between said body bearing surface and said washer bearing surface.

4. A fastener assembly as claimed in claim 3 wherein said body of plastic material is a discrete annular washer-like element.

5. A fastener assembly as claimed in claim 3 wherein said body of plastic material is a coating on at least one said bearing surface.

6. The fastener assembly of claim 3, said bearing surfaces including means for preventing the extrusion of said plastic material from between said bearing surfaces upon tightening of said threaded joint.

7. The fastener assembly of claim 6, said extrusion preventing means comprising recess means defined between said bearing surfaces.

8. The fastener assembly of claim 7, said recess means being defined by annular projecting dam portions of said bearing surfaces.

9. The fastener assembly of claim 7, said recess means being defined by a rough surface of at least one bearing surface.

10. In a fastener assembly for applying a clamp load to the flat, planar surface of a workpiece in a threaded joint, said fastener assembly comprising:
a threaded fastener having a body and having a thread structure disposed generally in a cylindrical plane parallel to and surrounding the central longitudinal axis of said body;
said body including a structure engageable by a tool for tightening of the threaded joint to urge the fastener assembly against the workpiece;
a clamp washer rotatable relative to said body and having a central aperture surrounding said cylindrical plane and interposed between said fastener body and the workpiece;
a body bearing surface defined on the workpiece-facing end of the fastener body and a cooperating washer bearing surface defined on one side of said clamp washer and interfacing with said body bearing surface; and a workpiece engaging clamp surface defined on the opposite side of said clamp washer;

the improvement in accordance with which the body bearing surface is a continuous annular spherical zone having a center of curvature lying on said body axis;

said clamp washer is resiliently deformable upon tightening of the threaded joint;

said clamp surface prior to tightening is a uniplanar truncated cone having a center of revolution coinciding with said axis and having line circle contact with said workpiece;

said washer bearing surface prior to tightening is a continuous annular zone having line circle contact with said body bearing surface;

the radius of curvature of said body bearing surface being equal to the radius of curvature of said washer bearing surface; and upon tightening said clamp surface deforms into a flat plane in area contact with said workpiece and said washer bearing surface simultaneously deforms into spherical segment area contact with said body bearing surface.

* * * * *

UNITED STATES PATENT AND TRADEMARK OFFICE
CERTIFICATE OF CORRECTION

PATENT NO. : 4,362,449

DATED : December 7, 1982

INVENTOR(S) : Emil J. Hlinsky

It is certified that error appears in the above-identified patent and that said Letters Patent are hereby corrected as shown below:

On the title page:

In the designation of Inventor,

"Inventor: Emil J. Hlinsky, Oak Brook, Ill." should read---Inventors: Emil J. Hlinsky, Oak Brook, Ill. and William L. Grube, Lake Bluff, Ill.---

Signed and Sealed this

Twenty-second Day of March 1983

[SEAL]

Attest:

GERALD J. MOSSINGHOFF

Attesting Officer

Commissioner of Patents and Trademarks